United States Patent [19]

Winchurch

[11] 4,065,079

[45] Dec. 27, 1977

[54] PARACHUTE REEFING DEVICE

[75] Inventor: Christopher John Winchurch, Biggleswade, England

[73] Assignee: Irvin Great Britain Limited, Letchworth, England

[21] Appl. No.: 662,296

[22] Filed: Mar. 1, 1976

[30] Foreign Application Priority Data

Mar. 5, 1975 United Kingdom ............... 9184/75

[51] Int. Cl.² .......................................... B64D 17/08
[52] U.S. Cl. ................................................ 244/152
[58] Field of Search ............. 244/142, 145, 152, 147, 244/148, 149; 24/205.11 R, 73 PH

[56] References Cited

U.S. PATENT DOCUMENTS

| 2,358,179 | 9/1944 | Marinsky | 24/205.11 R |
|---|---|---|---|
| 2,965,944 | 12/1960 | Moran | 244/148 |
| 3,506,225 | 4/1970 | Snyder | 244/149 |
| 3,525,491 | 8/1970 | Barish | 244/142 |
| 3,756,547 | 9/1973 | Snyder et al. | 244/152 |
| 3,945,592 | 3/1976 | Sutton | 244/152 |

FOREIGN PATENT DOCUMENTS 128,669   7/1919   United Kingdom ................ 244/152

Primary Examiner—Galen L. Barefoot
Attorney, Agent, or Firm—Beveridge, DeGrandi, Kline & Lunsford

[57] ABSTRACT

A parachute having a reefing device for securing together normally spaced parts of the canopy to provide a canopy that is reduced in size by the substantial elimination of a reefed section thereof as an effective drag area, and including a release device for releasing the reefed section of the canopy after initial parachute development to thereby permit the reefed section to inflate in full deployment of the canopy. The parachute may be conventional; a single skin gliding parachute having one or more wing sections wholly or in part reefed; or a multicellular double-skin ram-air inflated gliding parachute with some of the central cells reefed.

15 Claims, 14 Drawing Figures

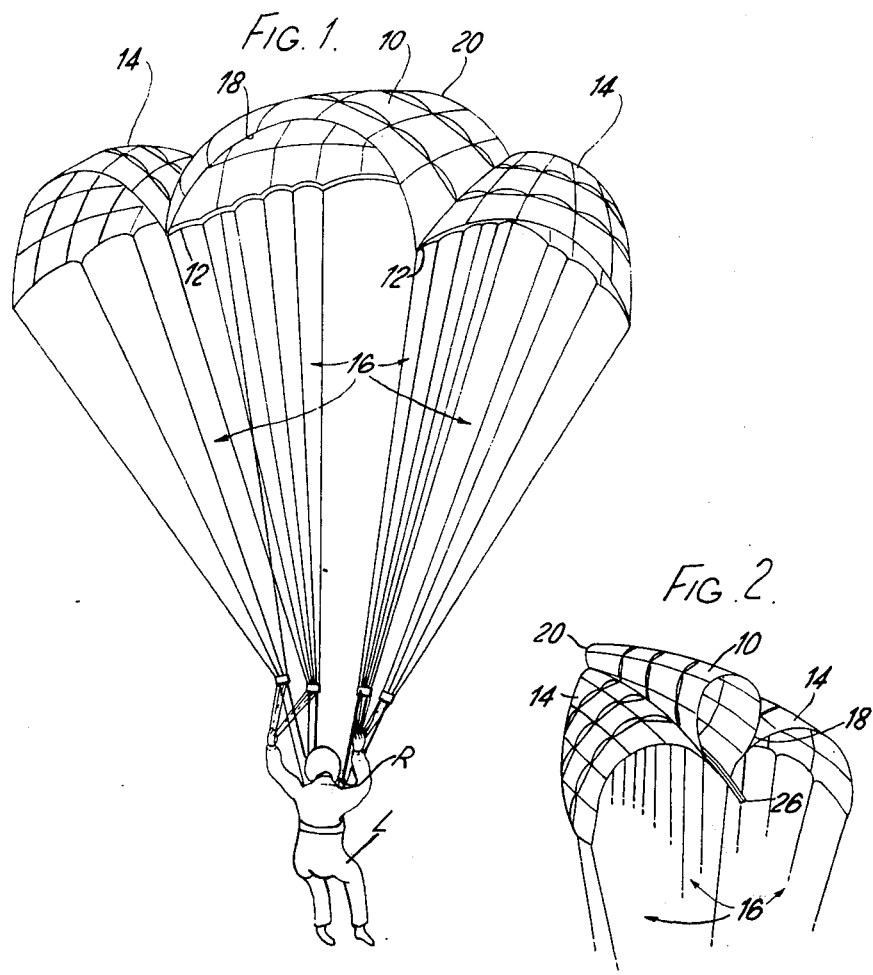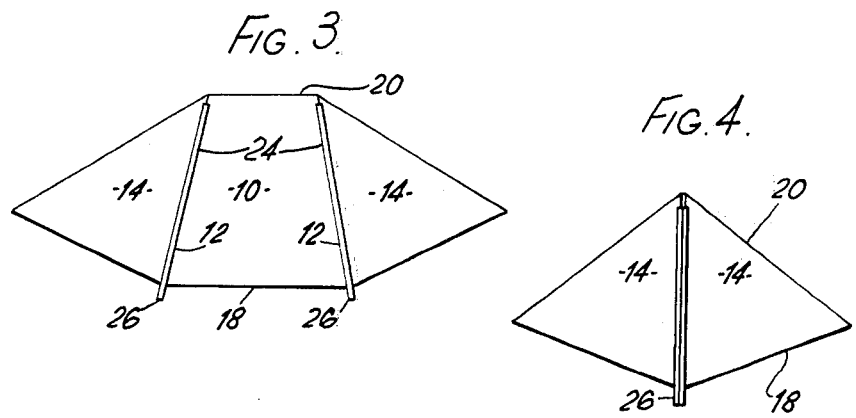

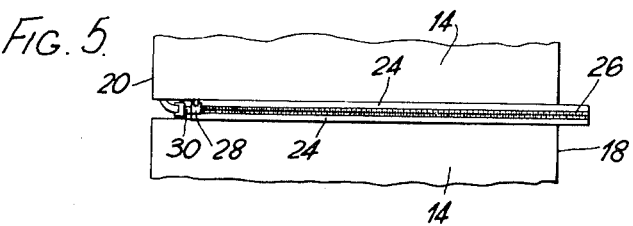
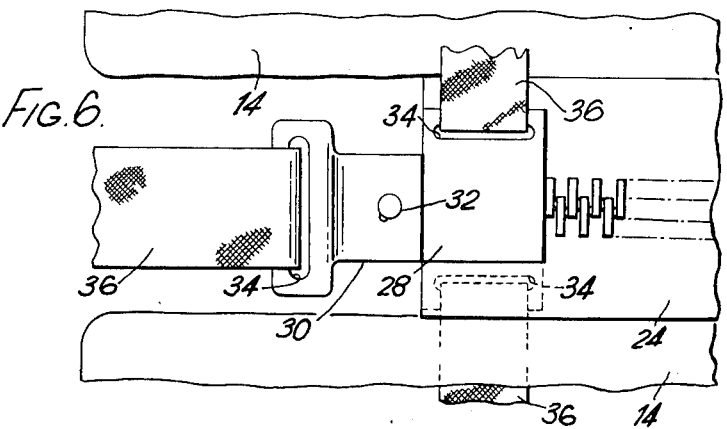
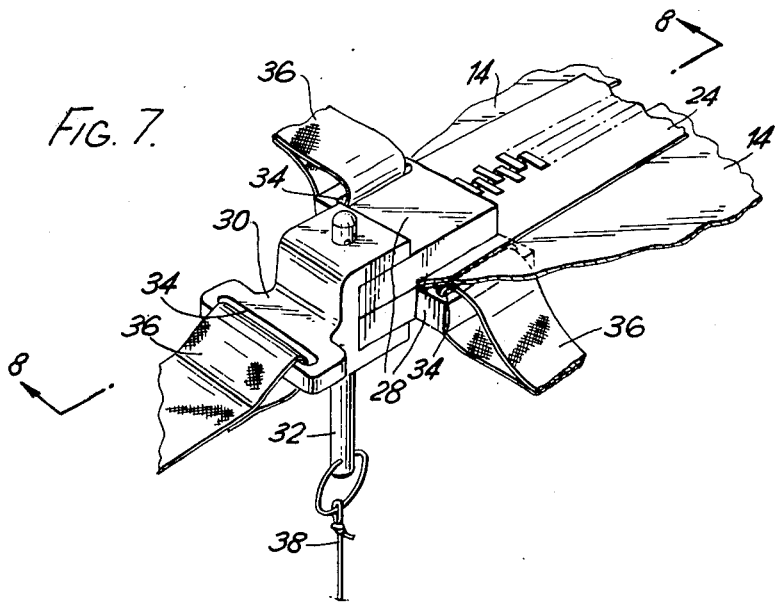

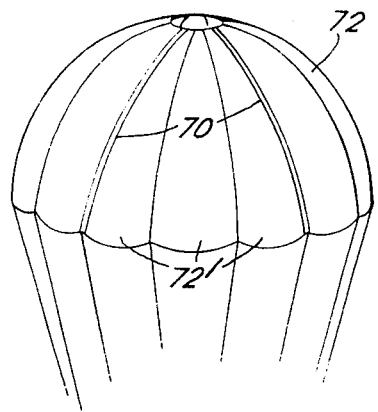
FIG. 13.
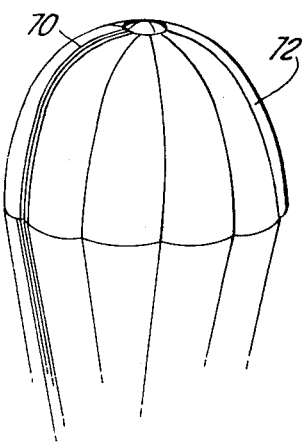
FIG. 14.
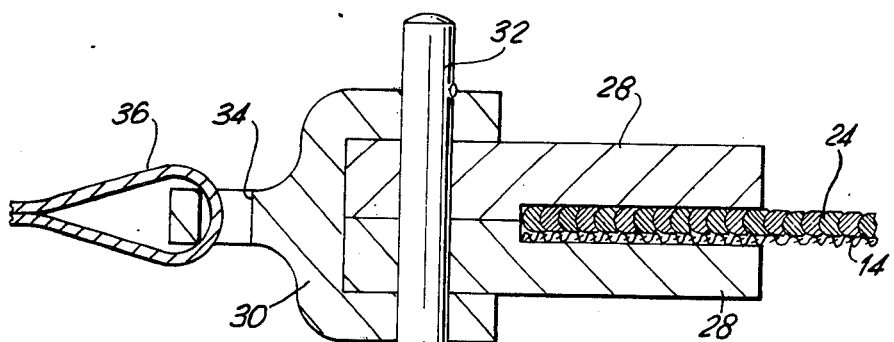
FIG. 8.
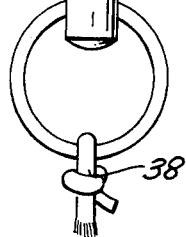

PARACHUTE REEFING DEVICE

This invention relates to parachutes and particularly but not exclusively to gliding parachutes.

A problem common to all parachutes is that of high opening shock loads which may damage the parachute or the load carried by the parachute. This problem is particularly acute in gliding parachutes which have inherently greater opening shock loads than conventional parachutes.

Various reefing control systems have been proposed to regulate inflation and opening of a parachute canopy during descent to reduce opening shock loads. Towards this end, opening or inflation of the parachute is restricted or retarded by a reefing line or similar restraint which reduces the drag area of the parachute. A typical reefing system as applied to a conventional parachute is a cord which runs around and constricts the mouth of the canopy. All such systems have in common an interference with the inflation of the canopy and result in a distortion of the inflated canopy to reduce its effective drag area and thus reduce the opening shock load. In so doing such systems increase the risk of a parachute failing to develop properly which risk is particularly serious in relation to gliding parachutes as these are inherently prone to development faults due to asymmetrical aerodynamic loading during inflation. The lack of a satisfactory means of reducing loads in gliding parachutes has significantly inhibited their use.

The present invention provides a parachute including reefing means for securing together normally spaced parts of the canopy thereby, as regards development of the canopy, to provide a canopy reduced in size by the elimination of a reefed section thereof intermediate said parts and means for releasing said reefing means after initial development of said canopy to allow said reefed section of inflate.

In use of a parachute according to the invention the canopy is initially deployed with said canopy section reefed. The reduced canopy size results in smaller shock loading whilst still permitting correct development for effectively arresting the fall of the parachute load.

After initial development, the reefing means may be released by said release means to permit the canopy fully to inflate so that the parachute has its full effect.

In the case of a gliding parachute, it is desirable that the parachute adopts as soon as it is developed an aerodynamically balanced condition. Hence it is desirable that the gliding parachute with said canopy section in the reefed condition be aerodynamically balanced when developed.

Hence in a specific aspect, the invention provides a gliding parachute including reefing means for securing together one or more pairs of two normally spaced parts of the canopy thereby, as regards development of the canopy, to provide a canopy reduced in size by elimination of a reefed section thereof intermediate the or each said pair of parts but which canopy is such as to permit correct development in an aerodynamically balanced state, and means for releasing said reefing means after initial development to allow the or each reefed sections to inflate.

For example with the type of single skin gliding parachute having canopy wing sections or lobes separated by keel lines from the forward edge of the canopy to the trailing edge as shown in British Pat. No. 1,197,746 and known as Parawing, a canopy lobe may have a longitudinal fold to reduce its size whilst retaining the same shape, or where three lobes are provided the central lobe may be reefed completely.

In the case of a multicellular double skin ram-air inflated gliding parachute, some of the central cells may be reefed to a closed condition.

The reefing means whilst being releasable must be secure enough that when the parachute is deployed the shock loading does not force the reefing means to a released condition. The reefing means may comprise a cord or rope laced through eyelets disposed along edge regions of said canopy parts and said section to be reefed and releasing means may be provided for withdrawing the cord or rope from the eylets. Alternatively more than one cord or rope may be used in the form of lacing.

The reefing means could comprise cords arranged to extend through the canopy and to secure said canopy section in a rolled up or furled condition to ensure that it does not affect the initial development. It is however envisaged that in most circumstances it is sufficient merely to fold or lap the canopy section and that billowing of the folded or lapped section during initial development will now significantly affect the parachute.

Alternatively and as preferred for simplicity and reliability the reefing means comprises a zip fastener, (otherwise known as a sliding clasp fastener) a length of which is secured to each of two opposite edge regions of said canopy section to be reefed. The zip lengths are fastened together to fold up the canopy section therebetween and are held fastened by locking means which may be coupled to release means actuable at a suitable time to release the locking means. Dynamic pressure on the canopy then exerts a force pulling the zip lengths apart to unfold the reefed canopy section.

Instead of a zip fastener, Velcro (RTM) tape may be used. The tape would be disposed so as to experience separating forces in shear, and release means would be provided to pull the tape lengths apart from each other when full deployment is to occur.

Preferred embodiments of the invention will now be described with reference to the accompanying drawings in which:

FIG. 1 is a perspective schematic view of a first embodiment of the invention comprising a twin keel gliding parachute in a fully inflated condition;

FIG. 2 is a plan view of the parachute of FIG. 1;

FIG. 3 is a perspective schematic view of the first embodiment with a centre lobe of the canopy reefed by reefing means;

FIG. 4 is a plan view of the first embodiment in the reefed condition;

FIG. 5 is an enlarged plan view of the reefing means of the first embodiment;

FIG. 6 is an enlarged plan view of part of the reefing means and releasing means of the first embodiment;

FIG. 7 is an enlarged perspective view of part of the reefing means and releasing means of the first embodiment;

FIG. 8 is a cross-sectional view taken along the line 8—8 of FIG. 7;

FIGS. 13 and 14 are perspective schematic views of a fourth embodiment of the invention comprising a conventional parachute.

Figure 9:
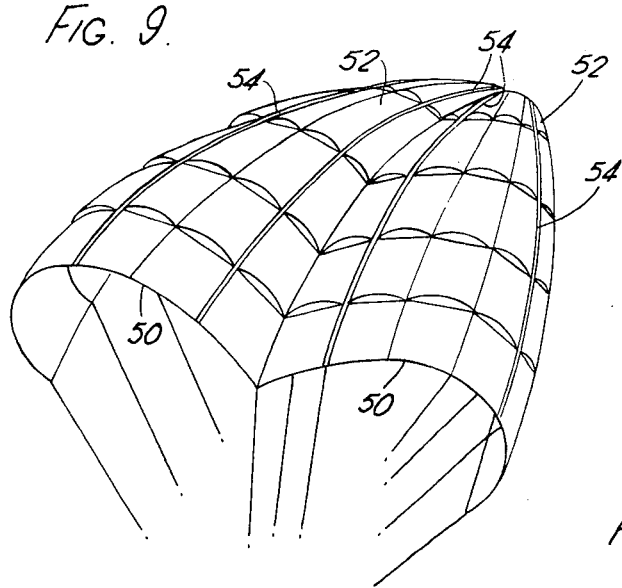
FIGS. 9 and 10 are perspective schematic views of a single keel gliding parachute in fully open and reefed conditions respectively, forming a second embodiment of the invention.

Referring to the first embodiment shown in FIGS. 1 to 8, the parachute canopy has a central trapezoidal wing section or lobe 10 connected along twin keel lines 12 to two outer triangular wing sections or lobes 14. Suspension lines 16 extend from keels 12 and the periphery of the canopy to a load L whether it be inanimate or a man.

To reduce shock loading when the parachute is developed reefing means are employed to fold up the central lobe 10 as shown in FIG. 2 and to secure together the normally spaced apart outer lobes 14 so that the effective canopy is reduced to the two outer lobes 14. Such reduced canopy is aerodynamically balanced and can glide. Thus in operation of the parachute, the parachute is initially developed in the reefed condition of FIG. 2. After a suitable interval when the initial shock loads are not significant, the reefing means can be released by actuation of release means R to allow the canopy to develop fully so that it can be fully effective.

The preferred reefing means comprises a zip fastener having two zip lengths 24 sewn on the lower surface of the canopy along keel lines 12. The lengths extend beyond the trailing edge 18 of the parachute to form a tail 26. The zip is closed adjacent the leading edge 20 of the parachute with a conventional zip sliding closure device which is removed from an end after closing together zip lengths 24. Whilst not essential, an end lock may be provided on tail 26 to prevent the zip creeping open during packing or deployment. The zip finishes short of the leading canopy edge as shown in FIG. 5.

This forward end of the zip is locked by locking means shown in detail in FIGS. 6 to 8 and comprising two superimposed clamp plates 28 recessed to receive and grip the end of the zip therebetween. The plates are clamped and held in position by a jaw member 30 which embraces end portions of plates 28 and is locked in position by a pip pin 32 or similar device extending through registering bores in plates 28 and member 30. Each of plates 28 and member 30 has a slot 34 receiving a loop of webbing 36 which serves to attach the parts to the canopy and serves to transmit the loading on the canopy to such parts.

Pin 32 is attached to a release cord 38. When, after initial development of the parachute, the canopy is to be opened fully, release means, comprising release cord 38 and a mechanical timer, barometric device, a lazy leg from the suspension lines or merely cord 38 arranged to be manually operated, is actuated to pull out pin 32 from fitting 30 and plates 28. The dynamic pressure forces on the canopy transmitted through webbing loops 36 pull apart plates 28 and fittng 30 so that the forward end of the zip is fully exposed to the dynamic pressure forces on the canopy. Since the forward end of the zip is set back from the forward canopy edge, there is ensured a force pulling the zip lengths apart at the forward zip end. There being no restraint, the zip lengths are rapidly pulled apart to allow the canopy to open fully.

Figure 10:
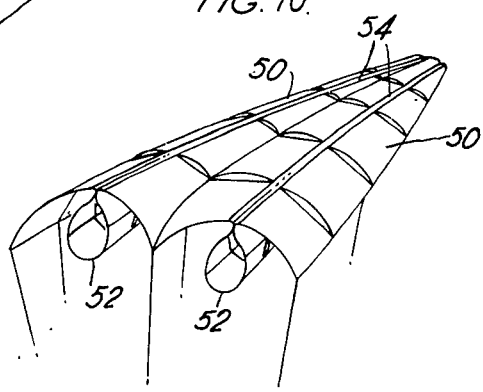

Similar reefing and release means to those shown are employed in the single keel gliding parachute shown in FIGS. 9 and 10. In this second embodiment each of the two lobes 50 has a central section 52 taken in by zip lengths 54 sewn along the length of the lobe from the forward to the trailing edge whereby the outer parts of each lobe are secured together. The resulting canopy of reduced size has a configuration as shown in FIG. 10 generally similar to that of the fully open canopy shown in FIG. 9 and is aerodynamically balanced.

Figure 11:
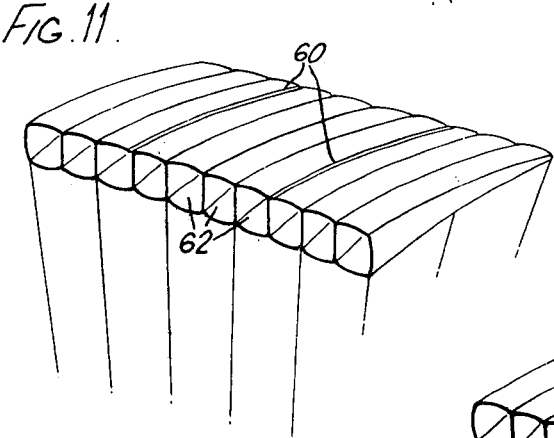
FIGS. 11 and 12 are perspective schematic views of a third embodiment of the invention comprising a multicellular double skin gliding parachute in the fully open and reefed conditions respectively.
Figure 12:
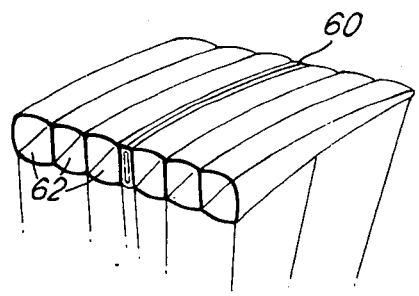

The same reefing and release means are used in the the third embodiment shown in FIG. 11 and 12 comprising a double skin ram-air inflated multicellular gliding parachute. Each zip length 60 of a zip fastener is sewn along seams between adjacent cells 62 in two symmetrical positions so that when the zip lengths are fastened together they take in a section of the canopy and several of the central cells closed in a reefed condition as shown in FIG. 12. The outer cells are thus secured together to provide a canopy of reduced size but of the same configuration as the fully open canopy as shown in FIG. 11 and thus aerodynamically balanced. Clearly any number of cells may be closed as required in the reefed condition. A particular advantage of such reefing is the outer cells, which have previously sometimes proved difficult to inflate, inflate easily in the reefed condition.

The fourth embodiment shown in FIGS. 13 and 14 is a conventional parachute having zip lengths 70 sewn from the mouth of the top of the canopy along seam lines between adjacent gores 72. When the zip lengths are fastened together the gore or gores 72' between the zip lengths are reefed and the gores on either side are secured together to provide as shown in FIG. 14 a canopy of reduced size but generally the same configuration as the fully open canopy as shown in FIG. 13.

What is claimed is:

1. A gliding parachute including a canopy having first and second stable stages of development and comprising a pair of wing sections having a keel line separating the same, said keel line extending from the leading edge of said canopy to the trailing edge of said canopy, reefing mean for releasably securing together normally spaced apart sections of each said wing sections to each side of the central portion thereof to provide a reefed section for each said wing sections, each said reefed section comprising a central portion of each said wing sections reefed by said reefing means from at least substantially the leading edge to at least substantially the trailing edge of said canopy, each reefed section of said canopy being substantially operably eliminated by said reefing means as a drag area of said parachute in the first of said stable stages of development of said canopy, and release means operable independently of the forces of inflation of said canopy for releasing said reefing means to allow each said reefed section to inflate as an operable drag area of said parachute in full deployment of said canopy as the second of said stable stages of development thereof.

2. A parachute as specified in claim 1 wherein said canopy includes three wing sections and the central wing section thereof comprises said reefed section of said canopy.

3. A gliding parachute including a canopy comprising a plurality of sections and having first and second stable stages of development, said canopy being in an aerodynamically balanced configuration in each of said stages of development thereof, reefing means extending along and at least adjacent opposite side edges of at least a section of said canopy for releasably securing opposed side edges thereof together and said section of said canopy having the same comprises a reefed section of said canopy, said reefing means being substantially interengagable with and along the length of said opposed siide edges of said reefed section, said reefed section of said canopy being substantially operably eliminated by said reefing means as a drag area of said parachute in the first of said stable stages of development of said canopy, and release means operable independently of the forces of inflation of said canopy for releasing said reefing means to allow said reefed section to inflate as an operable drag area of said parachute in full deployment of said canopy as the second of said stable stages of development thereof.

4. A parachute as specified in claim 3 wherein said reefing means comprise a zip fastener.

5. A parachute as specified in claim 4 wherein said reefing means includes locking means for locking together ends of said zip fastener, and said release means is operably coupled to said locking means for releasing said locking means on actuation of said release means.

6. A parachute as specified in claim 5 wherein said locking means comprises a pair of clamp members for clamping of said zip fastener ends therebetween and includes a holding member for holding said clamp members together in a clamped position.

7. A parachute as specified in claim 6 wherein said clamp members each comprise a plate and said holding member comprises a jaw for embracing the same, said holding member and clamp members having registering apertures and said locking member includes a locking device connected to said release means and extendant through said registering apertures of said holding member and clamp members, said clamping members being attached to said canopy.

8. A parachute as specified in claim 6 wherein said locking means is disposed adjacent to and set back from the leading edge of said canopy.

9. A parachute as specified in claim 6 wherein the end of said zip fastener opposite said ends thereof to be locked together extends a substantial distance from the trailing edge of the canopy.

10. A parachute having a plurality of gores extending radially from a central region thereof and including smoothly releasable reefing means for securing together normally spaced parts of the canopy thereof as a reefed section in a first stable stage of canopy development wherein the canopy thereof is reduced in size by the elimination of said reefed section thereof intermediate said parts as an effective drag area of said parachute, said reefed section comprising at least one of said gores, and release means operable independently of the forces of inflation of said canopy for releasing said reefing means after said first stable stage of canopy development to allow said reefed section thereof to smoothly inflate and providing a second stable stage of canopy development wherein the canopy is fully developed.

11. A parachute having a canopy including a plurality of elongate sections and smoothly releasable reefing means for securing together normally spaced parts of at least an elongate section of each canopy thereof as a reefed section in a first stable stage of canopy development wherein the canopy thereof is reduced in size by the elimination of said reefed section thereof intermediate said parts as an effective drag area of said parachute, said reefing means and said reefed section provided thereby extending longitudinally along substantially the entire length of said at least an elongate section of said canopy, and release means operable independently of the forces of inflation of said canopy for releasing said reefing means after said first stable stage of canopy development to allow said reefed section thereof to smoothly inflate and providing a second stable stage of canopy development wherein the canopy is fully developed.

12. A gliding parachute including a canopy comprising a plurality of elongate sections and having first and second stable stages of development, said canopy being in an aerodynamically balanced configuration in each of said stages of development thereof, reefing means for releasably securing together at least a pair of normally spaced apart elongate sections of said canopy to each side of at least an elongate section of said canopy, said at least an elongate section of said canopy intermediate said secured together at least a pair of normally spaced apart elongate sections of said canopy comprising a reefed section of said canopy and being substantially operably eliminated by said reefing means as a drag area of said parachute in the first of said stable stages of development of said canopy, said reefing means and said reefed section provided thereby extending longitudinally along substantially the entire length of said at least an elongate section of said canopy, and release means operable independently of the forces of inflation of said canopy for releasing said reefing means to allow said reefed section to inflate as an operable drag area of said parachute in full deployment of said canopy as the second of said stable stages of development thereof.

13. A parachute as specified in claim 12 having a double-skin multicellular ram-air inflated canopy and wherein at least one of the substantially centrally disposed cells thereof comprises said reefed section of said canopy.

14. A parachute as specified in claim 12 wherein said canopy comprises a plurality of wing sections having keel lines separating the same, said keel lines extending from the leading edge of said canopy to the trailing edge thereof, and at least a part of at least one of said wing sections comprises said reefed section of said canopy.

15. A parachute as specified in claim 12 wherein said reefing means extends along and at least adjacent opposite side edges of at least a section of said canopy for releasably securing opposed side edges thereof together and said section of said canopy having the same comprises said reefed section.

* * * * *